United States Patent [19]

Ohgawara et al.

[11] 4,428,006
[45] Jan. 24, 1984

[54] TELEVISION RECEIVER FOR RECEIVING SOUND MULTIPLEX SIGNALS

[75] Inventors: Yoshiaki Ohgawara, Inagi; Hideaki Fujii, Kiyose, both of Japan

[73] Assignee: Sony Corporation, Tokyo, Japan

[21] Appl. No.: 94,233

[22] Filed: Nov. 14, 1979

[30] Foreign Application Priority Data

Nov. 20, 1978 [JP] Japan .................. 53-143058

[51] Int. Cl.³ .................. H04N 5/78; H04N 5/44
[52] U.S. Cl. .................. 360/33.1; 358/188; 358/191.1
[58] Field of Search .................. 358/144, 188, 191.1, 358/198; 360/33; 179/100.11

[56] References Cited

U.S. PATENT DOCUMENTS

| | | | |
|---|---|---|---|
| 3,829,891 | 8/1974 | Uchida | 179/100.11 X |
| 4,031,548 | 6/1977 | Kato et al. | 358/188 |
| 4,097,899 | 6/1978 | Yu | 358/188 X |
| 4,139,865 | 2/1979 | Iida et al. | 358/188 |
| 4,151,557 | 4/1979 | Iida et al. | 358/188 |
| 4,182,991 | 1/1980 | Amano | 179/100.11 X |

OTHER PUBLICATIONS

Sound-Multiplex Television Receiver-Suzuki-Toshiba Review Jan.-Feb. 1970-pp. 7-12.

*Primary Examiner*—Aristotelis M. Psitos
*Attorney, Agent, or Firm*—Hill, Van Santen, Steadman & Simpson

[57] ABSTRACT

A television receiver capable of reproducing pictures and at least two audio channels from incoming broadcast video signals and also capable of receiving a video and audio signals from a video tape recorder with a video signal being applied to the receiver through one of the unused broadcast channels and the audio signals from the video tape recorder being supplied through a switching circuit to the audio system of the television receiver with an automatic switching arrangement for connecting the audio system to the output of the video tape recorder when the tape video tape recorder is connected to the input of the tuner of the receiver.

4 Claims, 3 Drawing Figures

TELEVISION RECEIVER FOR RECEIVING SOUND MULTIPLEX SIGNALS

BACKGROUND OF THE INVENTION

1. Field of the Invention

This invention relates in general to a television receiver and particularly to a television receiver capable of receiving sound multiplex signals.

2. Description of the Prior Art

In the prior art, when a broadcast television signal having sound multiplex is recorded on a magnetic recording and/or reproducing apparatus such as a VTR (video tape recorder) and the signal reproduced therefrom is supplied to a television receiver two methods described as follows have been proposed. One of the methods provides that the reproduced signal from the VTR is directly supplied to the input stage of the video amplifier circuit of the television receiver and the reproduced audio or sound signals comprising the sound signals of the main sound channel and the subsound channel or left and right sound signals are supplied to the low frequency amplifier circuit of the television receiver. The second method provides that the reproduced signal is modulated so that it is in the same form as the broadcast signal which is then supplied to the high frequency input stage of the television receiver.

In the first method, it is necessary to electrically isolate the magnetic recording and/or reproducing apparatus from the television receiver with the use of a coupling device such as a transformer, a photo-coupler or other simiar device. In this method, the coupling device for three systems are required and, thus, the former method is expensive and the cost becomes about equivalent wherein a television receiver and a reproducing apparatus are installed.

According to the second method, since the sound signal must be multiplied, especially the modulating processing circuit in the sound signal system becomes complicated and expensive which makes such system not so desirable.

SUMMARY OF THE INVENTION

It is an object of the present invention to provide a novel television receiver for sound multiplex systems.

Another object of the invention is to provide a television receiver of the sound multiplex type in which the number of coupling devices can be reduced relative to those of the prior art and which uses magnetic recording and/or reproducing apparatus in a simple and straight forward manner.

Another object of the invention is to provide a television receiver in which the sound signal system is automatically switched when a reproduced video signal is connected to the television receiver.

In a specific example of the invention, a television receiver is provided which includes a tuner circuit for receiving a number of broadcast television signals as well as a carrier signal modulated by at least a video signal reproduced from a signal recording and/or reproducing apparatus with the frequency of the carrier signal being selected to be different from the frequency of any of the multiple broadcast television signals and further including channel selecting means for controlling the tuner circuit and for selecting one of the plural broadcast television signals or said carrier and further including input terminal means for receiving at least two audio signals reproduced from the signal recording and/or reproducing apparatus and a signal switching circuit for selecting the two audio signals from said input signals and/or the audio signals decoded from one of the broadcast television signals and means for ganging the channel selecting means to the signal switching means.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

DESCRIPTION OF THE PREFERRED EMBODIMENTS

Figure 1:
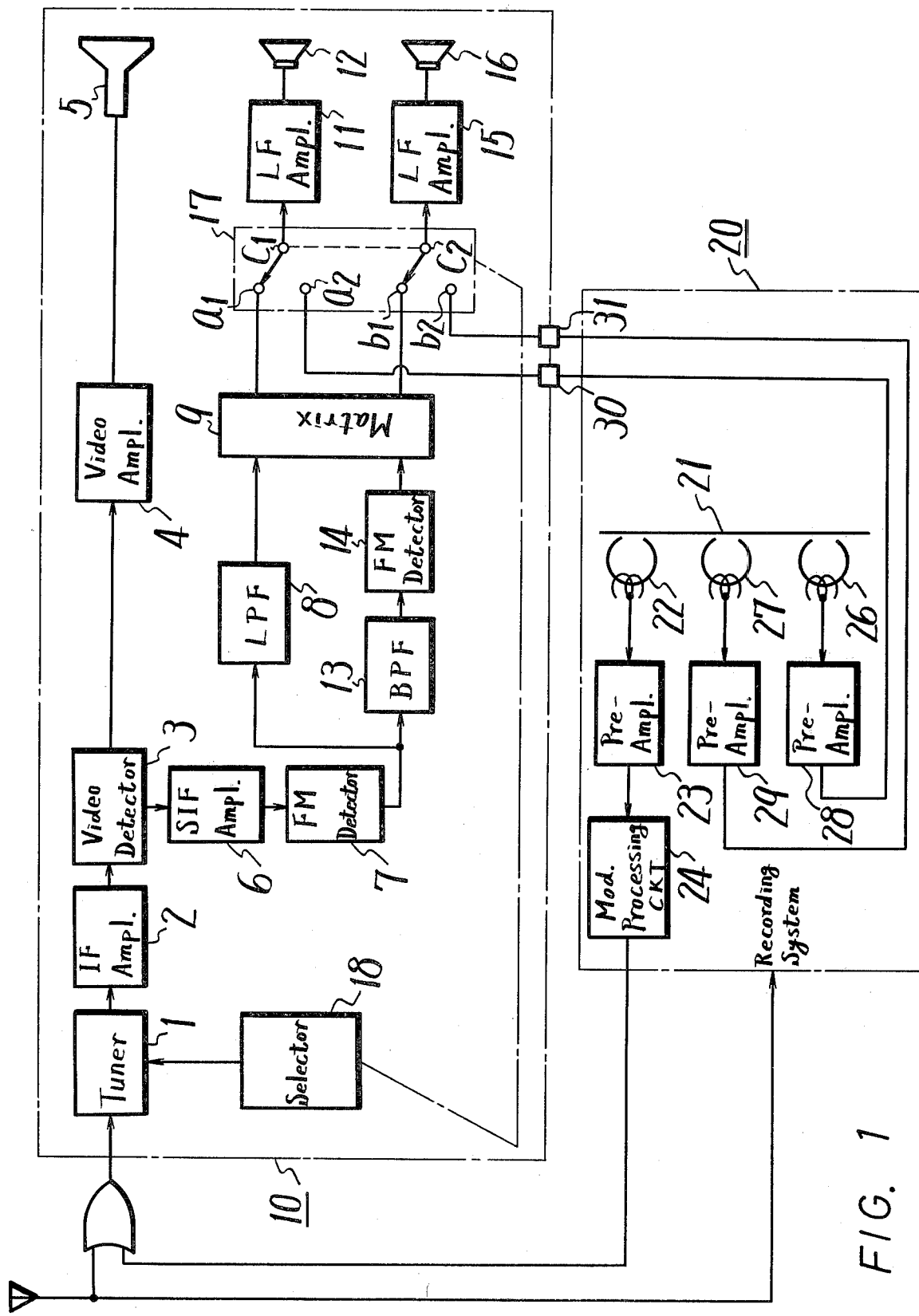
FIG. 1 is an electrical schematic block diagram illustrating a television receiver according to the present invention.

FIG. 1 illustrates a television receiver 10 which is capable of receiving broadcast television signals from an antenna through an AND gate or, alternatively, the output of a video tape recorder 20. The input of the television receiver 10 is supplied to an electronic tuner 1 which can be tuned to a number of broadcast channels. The output of the electronic tuner 1 is connected to an intermediate frequency amplifier 2 which provides an output to a video detector circuit 3. The output of the video from the video detector circuit 3 is applied to a video amplifier circuit 4 and the output of the circuit 4 is supplied to an image receiving tube such as a cathode ray tube 5. A sound intermediate frequency amplifier circuit 6 receives the sound signal from the video detector 3 and supplies an output to an FM detector 7 which may have a pass band of 4.5 MHz. The output of the FM detector circuit 7 is supplied to a low pass filter 8 from which the sound signal of the main sound channel is derived. The sound signal of the main sound channel from the low pass filter 8 is supplied through a matrix circuit 9 and a switch 17 to a low frequency amplifier 11 to a first speaker 12.

The detected output signal from the FM detector 7 is also supplied through a band pass filter 13 which separates the sound signal of a sub-carrier channel and supplies an output to an FM detector circuit 14 which detects the FM audio signal. The detected output from the FM detector 14 is supplied to the matrix circuit 9 which supplies an output through switch 17 to a low frequency amplifier 15 which is connected to a second speaker 16.

The switching circuit 17 connected ahead of the amplifiers 11 and 15 provides means for connecting the sound output from the low pass filter 8 and the FM detector 14 derived from the broadcast video signals received at the receiver 10 to the speakers 12 and 16 or, alternatively, allows sound signals to be applied to the amplifiers 11 and 15 and the speakers 12 and 16 from a video tape recorder 20. Thus, a pair of movable contacts $C_1$ and $C_2$ which are, respectively, connected to the amplifiers 11 and 15 are respectively movable between contacts a1 and a2 and b1 and b2. The fixed contacts a1 and b1 are connected to the output side of the matrix circuit 9 and, thus, when the contacts $C_1$ and $C_2$ engage these contacts the output of the broadcast channel received by the electronic tuner 1 will be applied to the speakers 12 and 16. The fixed contacts a2 and b2 are connected to the output of the video tape recorder 20 and when the movable contacts $C_1$ and $C_2$ are connected to these contacts, the speakers 12 and 16 will reproduce the sound signal from the video tape recorder 20. The switching of the contacts $C_1$ and $C_2$ is correlated with the channel selection circuit 18 which controls the electronic tuner 1 so that if a broadcast signal is being received by the television receiver 10, the contacts $C_1$ and $C_2$ will be connected to the fixed contacts a1 and b1. Alternatively, if the channel selection circuit 18 is connected to an unused broadcast channel which then connects the output of the video tape recorder 20 to the electronic tuner 1, the movable contacts $C_1$ and $C_2$ will be moved to engage the contacts a2 and b2 to receive the sound output of the video tape recorder 20.

For simplicity, in FIG. 1, only those portions of the video tape recorder 20 are illustrated which are relevant to an understanding of the invention. The magnetic tape 21 passes by a conventional video reproducing head 22 which can be formed as a rotary magnetic head of the well known type which supplies an output to a pre-amplifier 23 and which supplies an output to a modulation processing circuit 24 which modulates the video signal from the head 22 on a suitable high frequency carrier in the broadcast band which can be received by the electronic tuner 1. It is to be realized that the modulation would be selected so that it is on an unused video channel of the television receiver so that interference with an incoming broadcast signal does not occur.

On the video tape 21, the main sound channel and subsound channel are recorded on separate audio tracks and a first audio head 26 reproduces the sound signal of the main sound channel which is the left sound signal of low frequencies and the second audio head 27 reproduces the sound signal of the sub-sound channel or right sound track. The sound signals from the two heads 26 and 27 are, respectively applied to pre-amplifiers 28 and 29 and then to coupling means 30 and 31 which provide inputs to the contacts a2 and b2 of the switch 17.

When the reproduced sound signals are supplied to the low frequency amplifiers 11 and 15 through the switching circuit 17 coupling means 30 and 31 which may be transformers or photocouplers or similar devices are used to provide electrical isolation between the video tape recorder 20 and the television receiver 10. In a particular example constructed according to the invention, the coupling means 30 and 31 comprised photocouplers.

Figure 2:
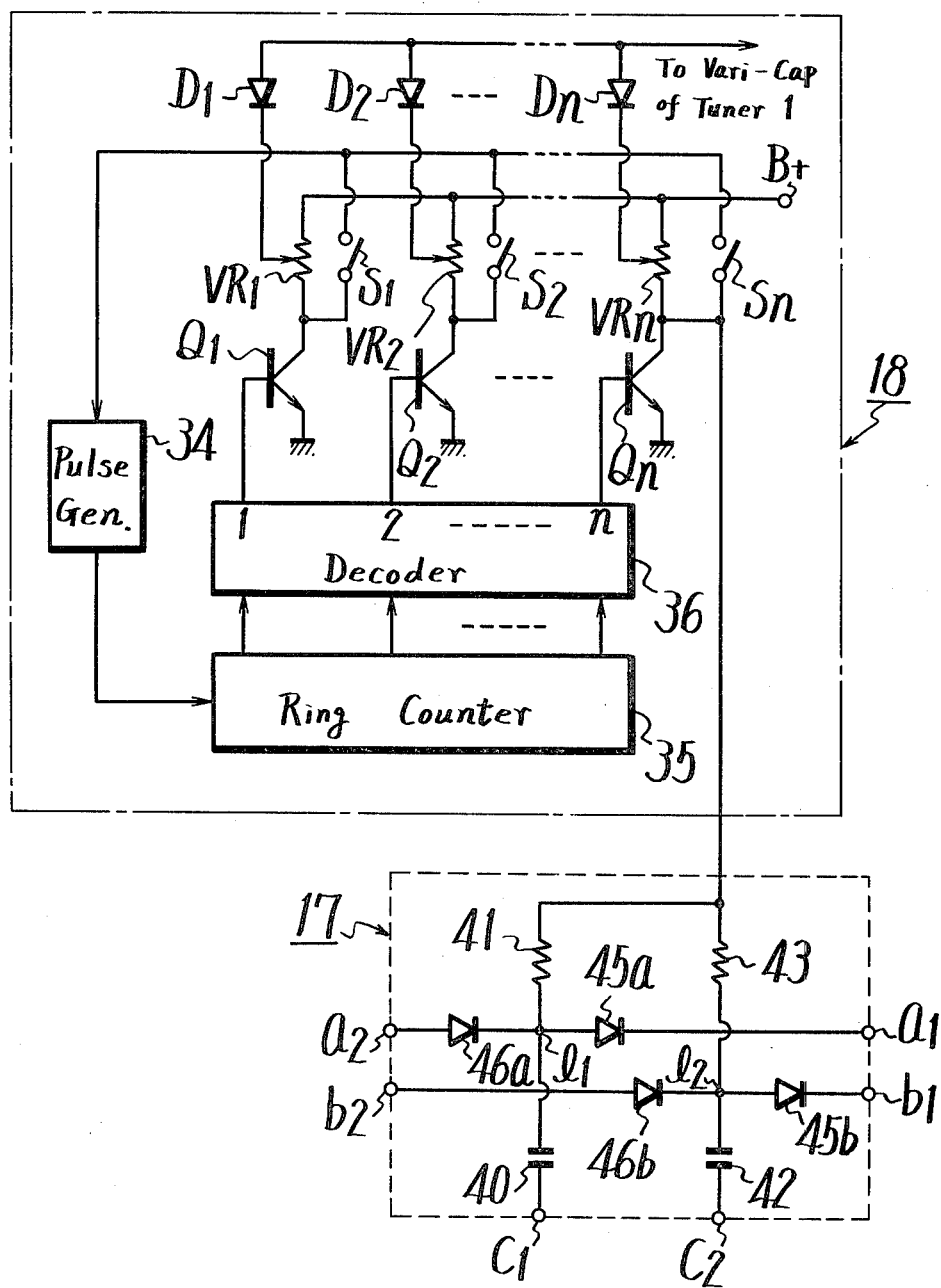
FIG. 2 is an electrical schematic diagram illustrating a part of FIG. 1.

FIG. 2 illustrates the channel selection circuit 18 and switching circuit 17 in which the channel selection circuit automatically energizes the switch 17 and wherein the switch 17 comprises an electronic switch rather than the mechanical switches illustrated schematically in FIG. 1.

The channel selection circuit 18 is of a preset type and includes a pulse generator 34 which supplies an output to a ring counter 35. The counted output from the counter 35 is supplied to a decoder 36 which has a number of outputs which are sequentially changed or shifted from "1" to "n" sequentially each time a pulse is applied to the decoder from the ring counter 35. Each of the outputs of the decoder 1, 2 - - - n are connected to basis of plurality of switching transistors Q1, Q2 - - - Qn as shown. The emitters of these transistors are connected to ground and the collectors of these transistors are connected to a biasing voltage B+ through resistors VR1, VR2 - - - VRn as shown. Each of the resistors VR1, VR2 - - - VRn has a slide contact which allows different preset voltages to be supplied as channel selection voltages to a variable capacitor or a vari-cap to control the electron tuner 1 so as to tune it to the selected channel. In other words, the voltages established by the slide contacts on the resistors VR1, VR2 and VRn comprise the tuning voltages for the electronic tuner 1. Diodes D1, D2 - - - Dn are connected to the slide contacts which engage the resistors VR1, VR2 - - - VRn so as to provide for blocking reverse current to the electronic tuner 1. Channel selections switches S1, S2 - - - Sn are respectively provided between the collectors of the transistors Q1, Q2 - - - Qn and the pulse generator 34 so as to control the drive of the pulse generator 34. When, for example, switch S1 is closed, the pulse generator 34 will be operated, and when the output of the decoder 36 arrives at terminal "1" the transistor Q1 will become conductive and a particular channel will be selected by the electronic tuner 1 which is determined by the setting of VR1 slide contact. Also, when switch S1 is closed, the operation of the pulse generator 34 will be stopped when transistor Q1 is turned on and the channel selected state associated with the slide contact which engages resistor VR1 will be maintained and the television receiver 10 will be tuned and remain tuned to such station.

In the example of the switching circuit 17 in FIG. 2, the switching circuit is a completely electronic switching circuit and terminals $C_1$ and $C_2$, respectively, represent the input terminals to the low frequency amplifiers 11 and 15. The terminals a1 and a2 represent the fixed contacts a1 and a2 illustrated in FIG. 1 and the contacts b1 and b2 represent the fixed contacts b, and b2 illustrated in FIG. 1. Contact $C_1$ is connected through a blocking capacitor 40 and a resistor 41 to the collector of a switching transistor Qn which corresponds to an unused broadcast channel. The terminal $C_2$ of the switching circuit 17 is connected to a blocking capacitor 42 and through resistor 43 to the collector of the transistor Qn. A switching diode 45a is connected between junction point between resistor 41 and capacitor 40 and terminal a1. A switching diode 46a is connected between terminal a2 and junction l1 between the resistor 41 and the capacitor 40. A diode 45b is connected between the junction point between resistors 43 and capacitor 42 and terminal b1 and a diode 46b is connected between the terminal b2 and the junction point l2 between the resistor 43 and the capacitor 42. The diodes 45a, 45b, 46a and 46b are poled as shown in FIG. 2. When any channel other than the channel associated with the video tape recorder which is an unused channel is selected, the switch Sn will be opened and one of the other switches S1, S2 - - - Sn will be closed to select a broadcast channel and at this time the voltage from B+ will be applied to the resistor VRn to the junction points l1 and l2 and diodes 45a and 45b will be in the on or conductive state and as a result, the sound signals received by the television receiver 10 from the broadcast station to which the receiver is tuned will be applied from terminals a1 and b1 to the low frequency amplifiers 11 and 15 through contacts $C_1$ and $C_2$ respectively.

On the other hand, if it is desired to apply the output of the video tape recorder 20 to the speakers 12 and 16, all of the switches associated with the broadcast channels such as S1, S2 will be opened and the switch Sn will be closed and the outputs of the coupling means 30 and 31 will be applied to terminals a2 and b2 and the diodes 46a and 46b will apply signals from the video tape recorder 20 to the contacts C₁ and C₂ where they will be supplied through the low frequency amplifies 11 and 15 to the speakers 12 and 16, respectively. Thus, as described above, when the unused channel is selected the switching circuit 17 will be automatically changed to receive VTR input and supply it to the speakers or, alternatively, when a broadcast channel is being received by the receiver 10 the audio signals from the broadcast channel will be applied to the speakers 12 and 16.

It is also possible that the channel selection and the switching circuit can operate in reverse manner as that described above, that is the unused channel can be automatically selected in association with the manual selection of the sound signal.

Figure 3:
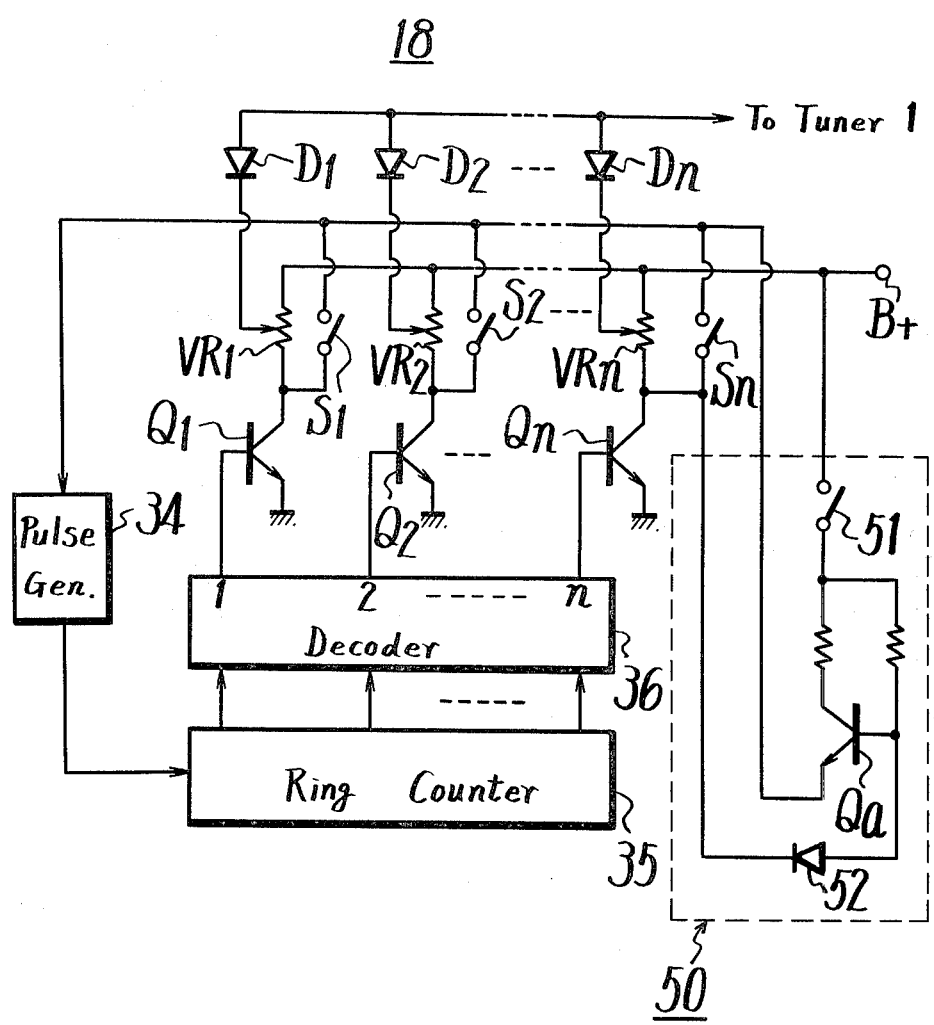
FIG. 3 is an electrical schematic diagram illustrating a modification of the portion of the invention illustrating FIG. 2.

FIG. 3 illustrates an example of this case and comprises an embodiment in which a control transistor Qa and a switch 51 and diode 52 are connected as shown in an unused channel selection circuit 50. The control transistor Qa and control switch 50 are connected in series between B+ and the drive circuit to the pulse generator 34. In this arrangement, though not shown in FIG. 3, the switching circuit 17 is formed as a mechanical change-over switch and the control switch 51 is switched in a ganged relation manner to the switching of the mechanical switching circuit 17. When the switching circuit 17 is in the switched state illustrated in FIG. 1, the control switch 51 will be in an opened condition. The base of the control transistor Qa is connected to the collector of the switching transistor Qn through a diode 52 which blocks reverse current.

When the switching circuit 17 is switched to connect the contacts C₁ and C₂ to the terminals a2 and b2 to receive the reproduced sound signal, the control switch 51 will be closed which will turn the control transistor Qa to the ON condition. This causes the pulse generator 34 to be operated. Therefore, the operation is similar to that when the channel selection switch Sn is closed and since the switching transistor Qn is closed, the unused channel will be selected. When the unused channel is selected, the base of the control transistor Qa will be grounded through the diode 52 and the transistor Qn and transistor Qa will be turned OFF which stops operation of the pulse generator 34. This sequential operation automatically selects the unused channel in response to the switching of the switching circuit 17.

As described above, according to the present invention, the coupling of the reproduced signal from the video tape recorder 20 to the television receiver 10 can be simply accomplished and the switching of the sound signal and the selection of the channels are mutually controlled which is very convenient.

Furthermore, according to the invention, the video tape recorder 20 can be very simple.

In this invention, a switching means such as a photocoupler or similar element may be used as the control switch 51 if desired.

Although the invention has been described with respect to preferred embodiments, it is not to be so limited as changes and modifications can be made which are within the full intended scope of the invention as defined by the appended claims.

We claim as our invention:

1. A combination television receiver and video tape playback device comprising, a tuner in said receiver and tunable to any one of a plurality of TV channels carrying video and at least a first audio stereo signal as well as to a TV channel which is unused in the area of the TV receiver, said TV receiver having means for demodulating at least said first audio stereo signal, first switching means having first and second positions receiving said first audio stereo signal, a pair of speakers connected to said first switching means and receiving said first audio stereo signal when said first switching means is in said first position, said video playback device producing a second audio stereo signal which is supplied to said first switching means, and to said pair of speakers when said first switch is in said second position and means for controlling the tuning of said tuner connected to said first switching means, wherein said video playback device produces a video signal and includes a modulation circuit for modulating said video signal on a TV channel which is unused in the area and supplies its output to said tuner, wherein said tuner is an electronic tuner, and a channel selection circuit is connected to said electronic tuner and to said first switching means to place it in said first position when said tuner is tuned to one of the plurality of TV channels and to place said first switching means in said second position when said tuner is tuned to said TV channel which is unused in the area, wherein said first switching means is an electronic switch, wherein said channel selection circuit has a first output lead connected to said electronic tuner, a plurality of different voltage developing means in said channel selection circuit and second switching means for selectively connecting one of said plurality of different voltage developing means to said first output lead, wherein said channel selection circuit has a second output lead which is connected to said first switching means and said second output lead connected to the one of said plurality of different voltage selecting means which causes said tuner to be tuned to said unused TV channel so as to switch said first switching means to its second position when said unused TV channel is tuned, and wherein said first switching means has a pair of output terminals, and first and second pairs of input terminals, a first pair of diodes, respectively, connected between said first pair of input terminals and said pair of output terminals, a second pair of diodes, respectively, connected between said second pair of input terminals and said pair of output terminals, a first resistor connected between said first output lead of said channel selection circuit and the junction point between first ones of said first and second pairs of diodes, and a second resistor connected between said first output lead and the junction point between second ones of said first and second pairs of diodes.

2. A combination according to claim 1 including a pair of capacitors connected between the first and second resistors and said pair of output terminals.

3. A combination according to claim 2, wherein said channel selection circuit includes a pulse generator, a ring counter connected to said pulse generator, a decoder connected to said ring counter, a plurality of transistors connected to the outputs of said decoder, a fixed voltage source, a plurality of resistors connected between said fixed voltage source and said plurality of transistors, a plurality of selector switches connected between said pulse generator and said plurality of transistors and said first output lead of said channel selection circuit connected to said plurality of resistors.

4. A combination according to claim 3 including additional transistor with one electrode connected to said pulse generator, an additional switch connected between a second electrode of said additional transistor and said fixed voltage source, and a third electrode connected to said second output lead.

* * * * *